Feb. 20, 1962    J. SOMERVILLE ETAL    3,021,759
PRACTICE DEPTH CHARGE DISPENSER
Filed Sept. 18, 1959    3 Sheets-Sheet 1
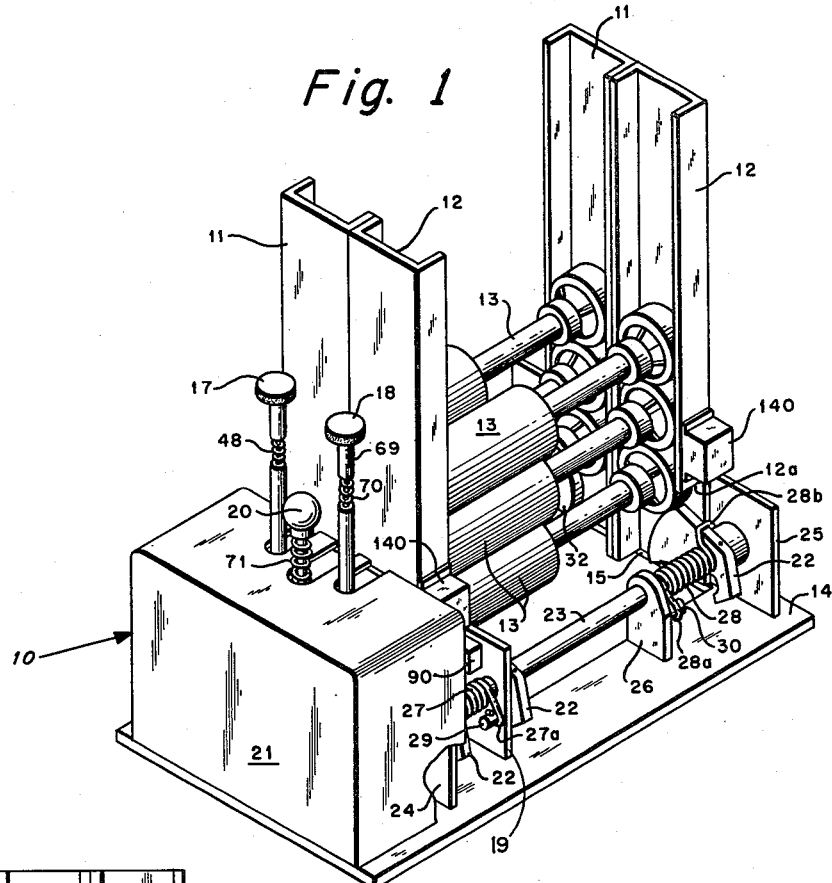
Fig. 1
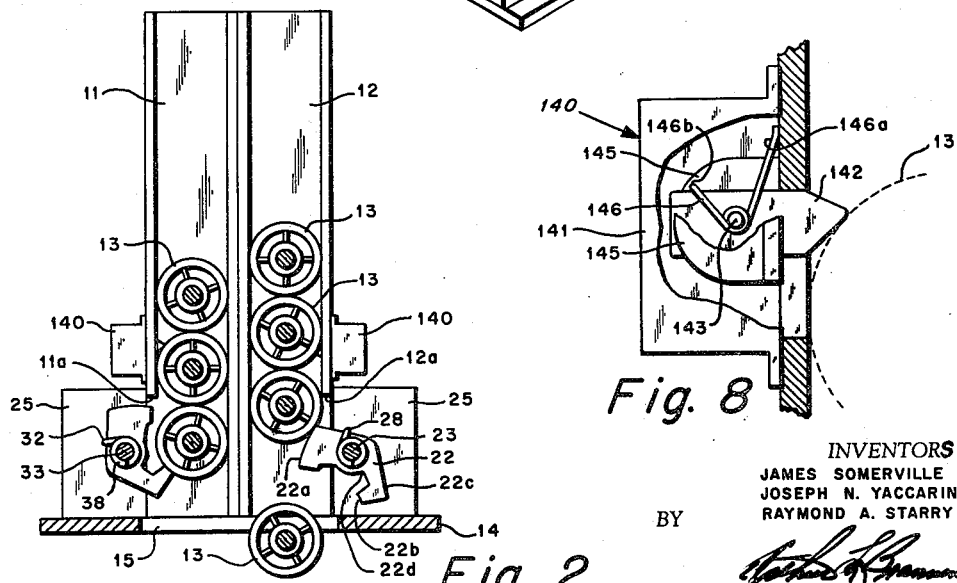
Fig. 2
Fig. 8
INVENTORS
JAMES SOMERVILLE
JOSEPH N. YACCARINO
RAYMOND A. STARRY
BY
AGENT Feb. 20, 1962  J. SOMERVILLE ETAL  3,021,759
PRACTICE DEPTH CHARGE DISPENSER
Filed Sept. 18, 1959  3 Sheets-Sheet 2
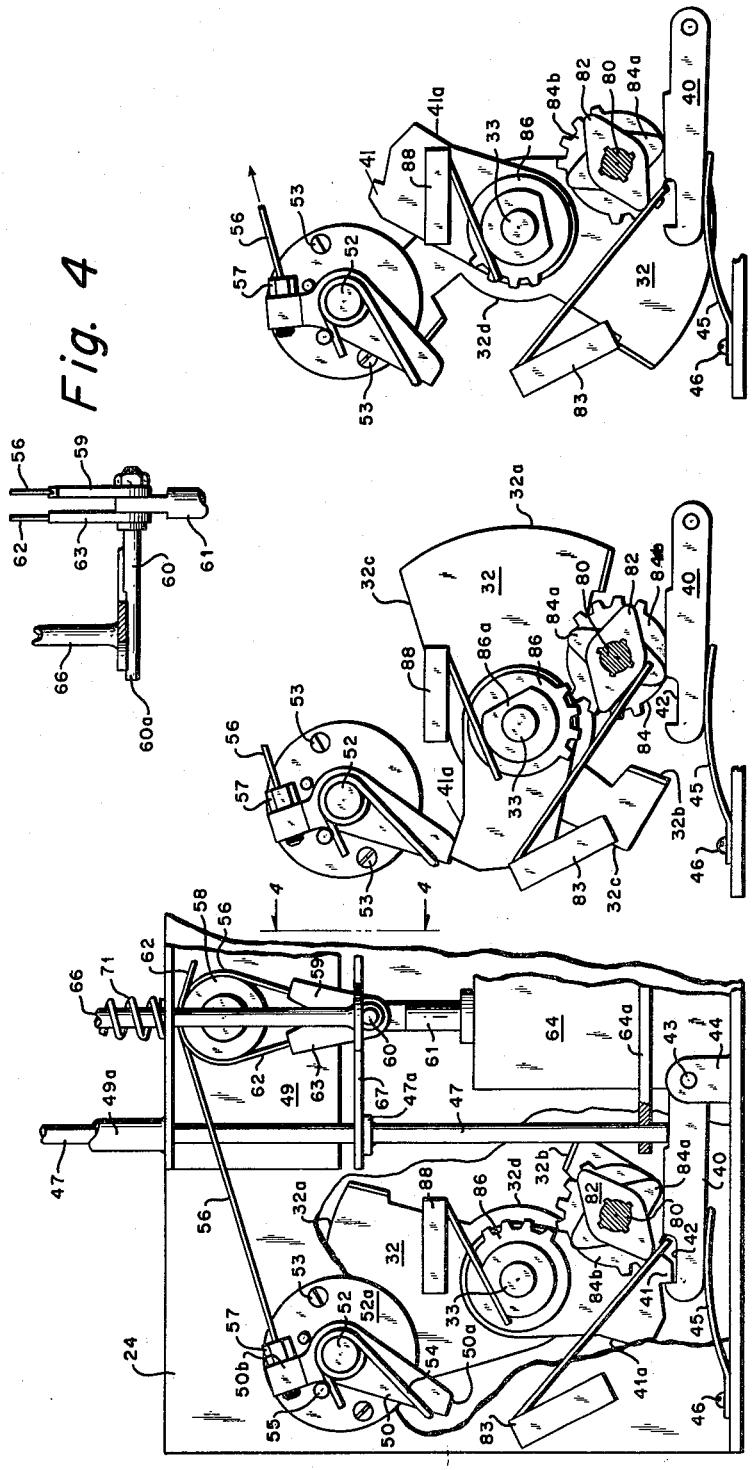
INVENTORS
JAMES SOMERVILLE
JOSEPH N. YACCARINO
RAYMOND A. STARRY
AGENT

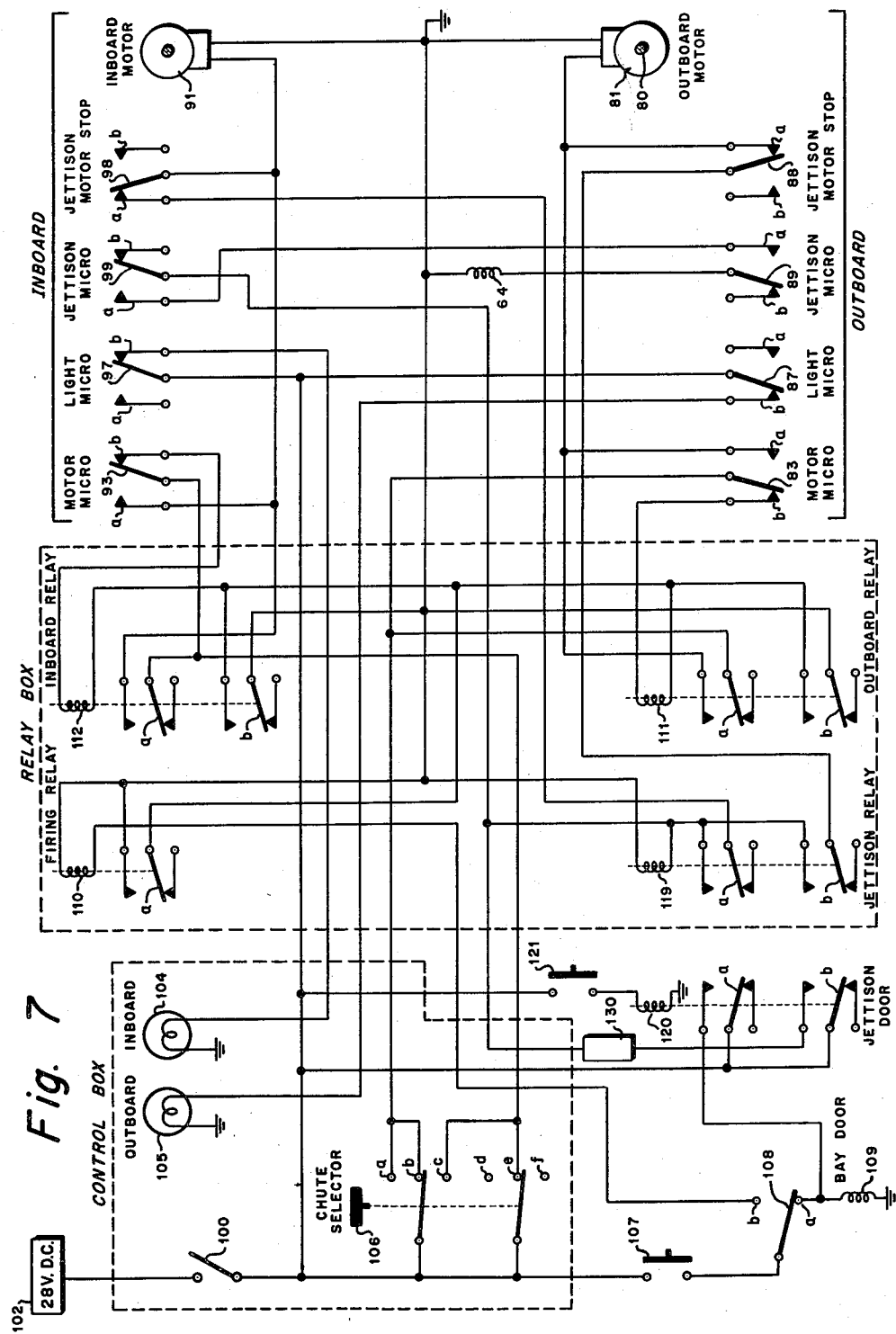

United States Patent Office 3,021,759
Patented Feb. 20, 1962

3,021,759
PRACTICE DEPTH CHARGE DISPENSER
James Somerville, Chalfont, Joseph N. Yaccarino, Center Square, and Raymond A. Starry, Levittown, Pa., assignors to the United States of America as represented by the Secretary of the Navy
Filed Sept. 18, 1959, Ser. No. 840,985
8 Claims. (Cl. 89—1.5)
(Granted under Title 35, U.S. Code (1952), sec. 266)

The invention herein described may be manufactured and used by or for the Government of the United States of America for governmental purposes without the payment of any royalties thereon or therefor.

This invention relates to an article dispensing apparatus, and more particularly, to a practice depth charge dispensing apparatus.

The present invention satisfies the need of the United States Navy for an airborne practice depth charge dispenser suitable for selectively dispensing practice depth charges of two different types without interfering with the other equipment normally installed aboard an aircraft. The dispenser is also suitable for and, if necessary, can be easily modified for dispensing other items of a military or commercial nature.

The dispenser is adapted to release one charge at a time when electrically triggered from a remote position or manually triggered at the dispenser itself. In addition, the charges can all be jettisoned by pressing a manually-operated trigger or when triggered electrically from a remote position. Furthermore, the dispenser apparatus is provided with signal lamps and electrical switches for indicating when charges are in position and available for dropping.

The invention has proved highly successful and is presently being used in large numbers by the U.S. Navy.

One of the principal objects of the invention is the provision of a novel practice depth charge dispensing apparatus suitable for use in an aircraft.

Another object of the invention is the provision of a novel article dispensing apparatus capable of permitting the selective release, either simultaneously or separately, of two different types of articles.

Yet another object of the invention is the provision of an article dispenser that is compact, easy to operate, maintain and install.

A still further object of the invention is to provide a material dispenser that is provided with novel manual and/or electrical controls.

A still further object of the invention is the provision, in combination, of independently operable manual and electrical control means for controlling the individual release or the jettisoning of articles stacked in a dispensing chute.

Yet another object of the invention is the provision of safety switch means for signaling the operator when the chute, referred to in the preceding paragraph, is free of articles and/or the articles are not properly positioned for release; and safety switch means for preventing the release of an article when the same is improperly positioned or operation of the mechanism when the chute is empty.

The invention further resides in certain novel features of construction, combinations and arrangements of parts, and further objects and advantages of the invention will be apparent to those skilled in the art to which it pertains from the following description of the present preferred embodiment thereof described with reference to the accompanying drawings, which form a part of this specification, and wherein the same reference characters represent corresponding parts throughout the several views, and in which:

FIG. 1 is a pictorial view with parts broken away of an apparatus embodying the invention, each of the outboard and inboard chutes of the apparatus being partially loaded with practice depth charges;

FIG. 2 is a vertical cross-sectional view of FIG. 1 for showing an outboard ejector foot in cocked or firing position and an inboard ejector foot in fired position;

FIG. 3 is a fragmentary and partially sectionalized schematic view in elevation and with a cover removed of the outboard ejector feet operating and control mechanism when the ejector feet are in a cocked position;

FIG. 4 is a view along section line 4—4 in FIG. 3 showing details of a jettisoning mechanism for both the outboard and inboard chutes;

FIG. 5 is a view for schematically showing the mechanism of FIG. 3 in fired position after a single charge has been dropped;

FIG. 6 is a view similar to FIG. 5, and shows the mechanism in jettisoning position;

FIG. 7 is an electrical circuit layout of invention; and

FIG. 8 is a fragmentary and partial cross-sectional view of one of four negative acceleration stops in the structure shown in FIGS. 1 and 2.

It is to be understood that the invention is not limited to the details of construction and arrangement of parts shown in the drawings and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Referring to FIG. 1, an article dispensing apparatus and more particularly a practice depth charge dispenser, indicated generally by the reference numeral 10, comprises a gravity-fed outboard feed chute 11 and a gravity-fed inboard feed chute 12, each having a stack of practice depth charges 13, in side by side relationship, slidably and guidably disposed therein. Each of the chutes 11, 12, comprises a pair of oppositely and vertically disposed, parallel channels rigidly fixed at the lower ends thereof to a rectangular base or mounting plate 14 with the webs of the channels in juxtaposition with the respective adjacent edges 15 of a rectangular bay opening formed in the base plate 14. Preferably, the base plate 14 is of an integral cast aluminum construction. Also the juxtaposed flanges or legs of the side-by-side channels of chutes 11, 12 are fixed together, preferably by welding, for adding to the rigidity of the structure. The flanges of the chute channels extend into the opening of the base 14 and provide sliding and guiding surfaces for the cylindrical external wall surfaces of the front and rear ends of the depth charges 13.

If desired, depth charges of two different types may be respectively stacked in the chutes 11 and 12 for permitting the selective dispensing of either type of depth charge.

Manually operated spring-loaded release control knobs 17 and 18, FIG. 1, can be depressed or pushed down for releasing individual charges 13 from the chutes 11 and 12, respectively. Jettisoning of both stacks of charges 13 in the chutes 11 and 12 is accomplished by depressing a spring-loaded jettison control knob 20.

The internal mechanism operated by the knobs 17, 18 and 20 is housed within a cover 21 at one end of the base plate 14. The mechanism is a twin mechanism in the sense that two substantially identical release mechanisms are provided, one for the outboard chute 11 and one for the inboard chute 12.

As best seen in FIGS. 1 and 2, the charges 13 in the inboard chute 12 are supported by a pair of parallel and identical ejector feet 22 fixed to a shaft 23. The shaft 23 is pivotally mounted in a pair of vertical, rectangular end walls 24, 25 fixed to the base plate 14 and the backs of the webs of the channels forming chutes 11 and 12. A pair of parallel journal pads 19, 26 integrally connected to the base 14 supports the ejector shaft 23 intermediate the ends of the shaft 23. The shaft 23 is biased in a counterclockwise direction into the fired position shown in FIGS. 1 and 2 by a pair of powerful torsion springs 27, 28. One end 27a, 28a of each spring 27, 28, respectively, is curled over a pin 29, 30, respectively fixed to journal pads 19, 26. The other end of each of the springs 27 and 28 are hooked over the ejector feet 22. The end 28b of the spring 28 is shown but the corresponding end of the spring 27 is hidden in FIG. 1 by the mechanism cover 21.

Referring to FIG. 2, only one of the ejector feet 22 is shown. Each foot 22 is formed with an arcuate heel portion 22a for supporting a charge 13 when in the fired position, as shown, and with a toe portion 22b for supporting a charge 13 when in a cocked position. The feet 22 each have a back portion 22c and an arch 22d. One of two outboard ejector feet 32 is also shown in FIG. 2, and for purposes of illustration, is shown in cocked position. The feet 22, 32 can assume a third position which is referred to herein as a jettisoning position, FIG. 6.

The outboard ejector arrangement is similar but opposite to the inboard ejector arrangement described hereinabove, the feet 32 being fixed on a shaft 33 which is biased in a clockwise direction by means of a pair of powerful torsion springs of which only spring 38 is shown in FIG. 2. The shaft 33 is journaled in the plates 24 and 25 opposite to the shaft 23. The lower portions of the outer lateral legs or flanges of the channels, forming the chutes 11, 12, are cut away at 11a, 12a, FIGS. 1 and 2, to permit the free movement of the ejector feet 32 and 22, respectively.

Referring to FIGS. 3–6, only the outboard dispensing mechanism is shown for purposes of illustrating and describing the operation of the invention. One ejector foot 32 is shown in a cocked, fired, and jettison position in FIGS. 3, 5, and 6, respectively.

Referring to FIG. 3, one of the ejector feet 32 is cocked and held, against the action of the torsion springs, by means of a sear 40 holding in position with a catch portion 42 a sear latch 41, which is fixed to the shaft 33. The end opposite to the catch portion 42 of the sear 40 is pivotally connected by means of a pin 43 to an upright leg 44 fixed to the plate 14. A sear leaf spring 45 normally urges the catch portion 42 of the sear 40 into latching engagement with the sear latch 41. The leaf spring 45 is fixed to the base plate 14 by fastener means such as a machine screw, only one screw 46 being shown at one end of the spring 45.

Upon depressing the outboard manual release knob 17, a lower end of a long vertical release rod member 47 integrally connected to the knob 17 is urged vertically downwardly against a coil spring 48, FIG. 1, for causing the sear 40 to be biased downwardly in a counterclockwise direction, FIG. 3, about the pin 43 against the leaf spring 45 for unlatching the sear latch 41 and permitting the ejector feet 32 to rotate in a clockwise direction. Accordingly, the charge 13 resting on the toe portions of the ejector feet 32 is permitted to be dropped through the rectangular opening in the base plate 14, FIG. 2. The release rod 47 is slidably guided in a sleeve 49a fixed atop a horizontal angle bar support bracket 49. The lower end of the release rod 47 is guided in a guide plate 64a forming a part of a solenoid housing 64.

Under the powerful action of the torsion springs, the shaft 33 turns and the ejector feet 32 follow around and present the heel portions 32a thereof to the second charge 13 following the first charge 13 just dropped and thereby prevents the second charge from being dispensed.

The shaft 33 is permitted to pivot through approximately one quarter of a turn by a jettison stop member 50 which has a tip 50a adapted to be engaged by a sear stop surface 41a of the latch 41 and thereby prevents the charges in the chute 11 from being jettisoned or dumped.

Jettisoning of the charges 13 in the chute 11 is accomplished by pivoting the jettison stop 50 in a clockwise direction, FIG. 3, and out of the way of the latch stop 41a for permitting the latter to swing past the stop 50 in a clockwise direction to the position shown in FIG. 6 where the back portions 32c of the feet 32 will permit the charges 13 to fall freely through the opening in the plate 14.

The jettison stop 50 is pivotally mounted on a journal pin 52 fixed to th upright end plate 24 by means of machine screws 53. The pin 52 terminates in a circular mounting flange 52a for effecting a solid mounting arrangement thereof. A torsion spring 54 is mounted on the pin 52, the stop 50, and another stop pin 55 in such a manner that the jettison stop 50 is normally biased in a counterclockwise direction into engagement with the stop pin 55, FIG. 3. Pin 55 is fixed to the flange 52a of the mounting pin 52 for limiting the pivotal movement of the jettison stop 50.

The jettison stop 50 is adapted to be biased to a jettison position by a cable arrangement comprising a cable 56 connected by means of a cable adjuster 57 to an upper end 50b of the stop 50, which is the shape of a dogleg. The cable adjuster 57 is threaded into the upper leg 50b of the jettison stop 50. The other end of the cable 56 is disposed over an outboard chute jettison pulley immediately behind a similar inboard chute jettison pulley 58, and terminating in a cable terminal eye 59. The eye 59 is pivotally connected to one end of a jettison pin 60, FIGS. 3, 4 in juxtaposition with the upper end of a solenoid armature 61, which is also pivotally connected to the jettison pin 60, FIG. 4.

The inboard arrangement is not shown since it is similar to the outboard arrangement, the inboard jettison cable 62 being shown disposed over the pulley 58 and terminating in a cable terminal eye 63. The eye 63 is pivotally connected to the jettison pin 60 on a side of the solenoid armature 61 opposite to the outboard cable terminal 59.

The solenoid armature 61 can be biased vertically downwardly into the solenoid housing 64, when the same is electrically energized in a manner to be described, or when the jettisoning knob 20 is depressed.

The jettisoning knob 20 is integrally connected to a vertical rod 66 which is slidably guided in a hole formed in the horizontal flange of the angle bar support bracket 49. The lower terminal end of the jettison rod 66 is fixed to a horizontal plate-like yoke member 67 at the center portion of the latter. The yoke member 67 curves around the cable terminals 59, 63 and is slidably guided about the outboard release rod 47 and a similar inboard release rod 69 integrally connected to the inboard chute release knob 18, FIG. 1. The inboard release knob 18 is spring-biased upwardly by a coil spring 70 and is slidably guided in a guide sleeve 49b, which is fixed atop the bracket 49 parallel to the sleeve 49a. Each of the release rods 47 and 69 is provided with an annular buttress flange, only the flange 47a being shown in FIG. 3, for permitting the yoke member 67 to rest thereon. A coil spring 71 normally biases the jettisoning rod 69 and knob 20 vertically upwardly in a conventional manner. The jettison pin 60 has a flattened extended portion 60b substantially coplanar with the buttress flanges of the release rods 47 and 69, FIG. 4, so that the depression of the knob 20 will force the release rods 47, 69 downwardly for first depressing the sears and then moving the jettison stops out of the way via the cable arrangement and thereby permitting the charges in the chutes 11, 12 to be simultaneously jettisoned. In fact, upon depressing the jettison knob 20, the bottommost charge in each of the chutes 11, 12 are released when the sear is depressed and the ejector feet are accordingly permitted to move from a cocked, FIG. 3, to a fired position, FIG. 5. Then, since the jettison stop 50 is by that time moved out of the way through the cable arrangement, the ejector feet are pivoted around to permit both chutes 11, 12 to be emptied, FIG. 6. The knob 20 need not be held down because once the jettisoning has begun there is no way to stop the process in time since the feet must be again cocked either manually or by an electrical apparatus to be described.

In lieu of depressing the jettison knob 20, the jettison solenoid can be energized and the solenoid armature 61 is moved downwardly for swinging the jettison stops out of the way via the cable arrangement. However, there is no way to simultaneously operate the release rods 47 and 69 for operating the sears unless the knobs 17, 18 are simultaneously depressed.

Accordingly, an electrical arrangement is provided to perform the function of operating the sears. Since the outboard and inboard arrangements are substantially alike, only the outboard arrangement will be described. Referring to FIG. 3, a drive shaft 80 of an outboard electrical motor 81, FIG. 7, is adapted to drive a substantially diamond-shaped or double-lobe cam 82 splined thereon, the cam 82 being adapted to operate a microswitch 83, FIGS. 3 and 7. Mounted beside the cam 82 is a combination cam and gear member 84 comprising a double lobe sear cam 84a, similar to the cam 82 but 90° out of phase therewith, for depressing the sear 40. When the sear cam 84a depresses the sear 40, the cam 82 moves the switch 83 from fired position contact 83a to cocked position contact 83b, FIG. 7, for a purpose to be described.

The gear portion 84b of member 84 is provided with two groups or sectors of oppositely disposed gear teeth adapted to mesh with only one group or sector of gear teeth of a gear 86 fixed to the outboard ejector shaft 33. Preferably, each sector has a series of four involute teeth. The gear is provided with a flat 86a on the base circle thereof adapted to operate a jettison motor actuator microswitch 88, FIGS. 3 and 7. Contacts 88a and 88b are closed by the switch 88 when the mechanism is respectively cocked or fired, FIGS. 3, 5. The flat 86a is flush with the switch 88 when the ejector mechanism is cocked and, accordingly, the contact 88a is closed. When the switch 88 rides on the base circle of the gear 86, the circuit controlled by the switch 88 is open.

With particular reference to FIG. 7, the operation of the electrical circuit will be described.

In addition to the microswitches 83 and 88, an outboard panel light switch 87 and a jettison microswitch 89 are mounted on a switch bar, not shown. However, a similarly functioning pair of panel light and jettison switches 97 and 99 for the inboard chute are mounted on a switch bar 90 fixed to the journal pad 19 in proximity with the stacked charges 13 in the chute 12. The switches 97 and 99 are adapted to be moved from contacts 97a, 99a to contacts 97b, 99b, respectively, when a ready-to-be-fired charge 13 is bearing against the switches 97, 99 in chute 12. Similarly, the outboard switches 87, 89 are respectively moved from contacts 87a, 89a to contacts 87b, 89b when a store 13 is in firing position in outboard chute 11. It is also to be understood that the inboard ejector mechanism operates a motor microswitch 93 and a jettison motor microswitch 98, mounted in a manner similar to the corresponding outboard switches 83 and 88, for operating an inboard motor 91, FIG. 7. Each of the switches 93, 98 is moved from contacts 93a, 98b, respectively, into make position with cocked position contacts 93b, 98a.

*Electrical operation*

Assuming that the chutes 11, 12 are loaded with charges 13, the bay door is closed, if any, and a master switch 100 has been closed, 28 volt, direct current energy flows from an aircraft electrical power generating unit 102 through the closed inboard and outboard light switches 97, 87 to respectively energize grounded inboard and outboard panel lights 104, 105. A chute selector switch 106 is provided with a pair of pivoted arms for simultaneously closing a pair of two groups of contacts a, b, c and d, e, f. The contacts 106a, b are tied together, and the contacts 104c, e are tied together. Contacts 106d, f are not in use. Thus, by moving the knob 106 to the first position, only the outboard chute will be used to dispense a charge by closing a charge release or pickle switch 107. When the knob 106 is moved to the second position, a charge from each of the chutes 11, 12 will be dispensed upon the closing of the pickle switch 107. When the knob 106 is moved to the third position, a charge from the inboard chute 12 will be dispensed upon the closing of the pickle switch 107.

The closing of the release switch 107 will not operate to cause the release of a charge 13, until a bay door safety limit switch 108 has been moved from a contact 108a to a contact 108b. Therefore, with the door switch 108 closed with contact 108a, a grounded bay door release solenoid 109, which releases a door latch or lock, is energized and then the door limit switch 108 is closed; and then a firing coil 110 of a firing relay is energized and its normally open contact 110a is closed. In addition to the firing relay 110, there is an outboard relay 111 having normally open contacts 111a, b and an inboard relay 112 having normally open contacts 112a, b. A jettison relay 119 having normally open contacts 119a, b is also provided along with a jettison door relay 120 having contacts 120a, b energized by the closing of a jettison switch 121 to be explained. The relays 110, 111, 112, 119 and 120 are mechanically held relays.

Normally the motors 81, 91 will be energized to cock the respective ejection shafts 33, 23. Therefore, assuming the shafts 33, 23 are uncocked and the master switch 100 has been closed and the chute selector 106 has been moved to close contacts 106b, e, FIG. 7, the relay 120 and jettison switch 121 are open, the pickle switch 107 is open, and the bay door is closed; the relays 111, 112 will be energized since energy will flow from the supply unit 102 through the selector switch 106 through motor micro contacts 83a and 93a to energize the motors 81, 91 and cock the mechanisms for chutes 11, 12, respectively.

Once cocked, the motor micro switches 83, 93 close contacts 83b, 93b.

Once the contacts 83a, 93a are broken, the motor circuits are broken. The relays 110, 111, and 112 are not energized at this time because they are not grounded.

The pickle switch 107 can now be closed for dropping a charge 13 from each chute 11, 12 with the chute selector contacts 106b, e remaining closed. Closure of the pickle switch 107 opens the bay door as described; and through contact 108b the grounded firing relay 110 is energized and a charge goes through its closed contact 110a and energizes relays 111, 112, which are grounded through closed contacts 111b, 112b, respectively, for holding the relays 111, 112 closed. Consequently, the motors 81 and 91 are energized because energy flows thereto through contacts 83b, 111a and 93b, 112a, respectively.

If it is desired to dispense only from the outboard chute or the inboard chute, the chute selector 106 is moved to either close contact 106a or 106c, and accordingly, the inboard relay 112 or the outboard relay 111 are cut out of the firing circuit.

In emergencies, the charges 13 may be dumped by closing the jettison switch 121 and energizing the door relay 120 and closing the contacts 120a, b. The closing of the contact 120a energizes the bay door release solenoid 109. The closing of the contact 120b energizes the grounded relay 119 and causes the motors 81, 91 to be put into circuit through closed contacts 119b, 88a and 119a, 98a, respectively. Once the first charges 13 from the chutes have been dispensed, the series connected switches 89, 99 are spring biased closed with contacts 89a, 99a, respectively, and an electrical charge is passed therethrough to the motors 81, 91 from the closed contact 120b, and the stop 50 is actuated out of the way through the pulley arrangement. A time delay 130 is provided in the circuit to give the bay door a chance to open. Accordingly, the ejection shafts 33, 23 are driven to cause the ejection feet 32, 22 to assume a position corresponding to that shown in FIG. 6. The riding up of the jettison motor stop switches 88, 98 upon the base circles of the respective cams, only the outboard cam 86a being shown in FIGS. 3, 5 and 6, causes the motor circuits to be broken. In the instant situation, the switches 83, 93 are by-passed so that the motors continue to operate until the switches 88, 98 are opened by the respective cams.

The switches 89, 99 are normally spring biased closed unless opened by charges 13 in the firing position in the chutes 11, 12, in which instance electricity will not flow through the coil 64 since it will not be grounded. In any event, by closure of the switch 121, coil 109, the relay 120, and the relay 119 will be energized causing the bay door to be opened and the ejector mechanism will be moved to fired position, FIG. 5 even when chutes 11, 12 are empty. If desired, the relays 119, 120 can be electrically interlocked with the switches 89, 99. Accordingly, the motors 81, 91 in the jettison circuit may be stopped when the switches 88, 98 are respectively opened.

FIG. 8 illustrates the details of a negative acceleration or gravity stop assembly, indicated generally by the reference numeral 140, for assuring that the lowermost charge 13 in each chute 11, 12 is properly positioned. When an aircraft is bouncing around or undergoing negative acceleration, the charges may tend to move up in the chutes. Four of the assemblies 140 are provided, one in the outer lateral flange of each channel, FIGS. 1 and 2. Within a housing 141, a lever stop 142 is pivotally mounted on a pin 143 supported by a pair of parallel angle bracket 144, 145 fixed to a chute flange. A V-shaped torsion spring 146 has a pair of free parallel arms 146a bearing against the outer side of a chute flange and each arm is provided with a loop 146b near the midportion thereof for retaining the spring 146 on the pin 143. The spring 146 normally biases the stop 142 in a counterclockwise direction about the pin 143 against the upper edge of a rectangular slot 147 in the chute flange bearing the assembly 140. The slot 147 is long enough to permit the stop 142 to swing downwardly and thereby permit the downward passage of a charge 13, but not upwardly past the stop 142.

While a specific embodiment of the invention has been shown and described, it is understood that the same is susceptible of many changes and modifications, as known to a person skilled in the art, and it is intended to cover all such changes and modifications coming within the scope of the appended claims.

What is claimed is:

1. A practice depth charge dispensing apparatus comprising, a base plate having a bay opening formed therein, chute means mounted upon said base plate in such a manner that practice depth charges stacked in said chute means may be guided through said opening, at least one pair of transverse vertically-arranged parallel plates fixed to said base plate and said chute means, ejector shaft means journaled in said plates laterally disposed about said chute means and said opening, a pair of parallel ejector feet fixed to said ejector shaft means and each of said ejector feet having a toe portion adapted to extend into said chute means for the purpose of having the lowermost practice depth charge in said chute means resting thereon when said ejector shaft means is in a cocked position, each of said ejector feet having a heel portion for intercepting and supporting the stack of practice depth charges when in a fired position, torsion spring means normally biasing said ejector shaft means into the fired position, sear means pivotally connected to said base plate and having a latch portion adapted to latch said ejector shaft means in a cocked position, spring-returned first release rod means for operating said sear means for releasing said ejector shaft means and permitting said torsion spring means to bias said ejector shaft means and said ejector feet from the cocked position to the fired position, jettison stop means pivotally mounted on an adjacent one of said transverse plates, resilient spring means normally biasing said jettison stop means into a position for stopping the pivotal movement of said ejector shaft means at the fired position and causing the heel portions of said fired ejector feet to support the practice depth charges in said chute means after a practice depth charge has been dispensed by said ejector feet being moved from the cocked to the fired position, spring-returned jettisoning release rod means having a yoke fixed at the lower end thereof, said first release rod means having a flange fixed thereto supporting said yoke in such a manner that the operation of said jettisoning release rod means causes the depression of said first release rod means and said respective sear means for causing the release of a practice depth charge from said chute means, pulley means, a journal pin fixed to said one transverse plate and having said pulley means journaled thereon, armature means slidably guided for vertical movement, a jettisoning pin connected to said armature means, pulley cable means having one end fixed to said jettison stop means with the other end disposed over said pulley and connected to said jettisoning pin, said jettisoning pin having a portion adapted to be engaged by said yoke and biased downwardly for biasing said jettison stop to a position permitting said torsion springs to bias both said ejector shaft means and said ejector feet to a jettisoning position whereby said heel and toe portion of said ejector feet are moved out of said chute means and all of said practice depth charges are jettisoned.

2. A practice depth charge dispensing apparatus as set forth in claim 1, further comprising, electrical motor means mounted on said base plate, single-sector follower gear means fixed to said ejector shaft means, driven double-sector gear means fixed to the drive shaft of said motor means and adapted to intermittently mesh with said single-sector follower gear means, first electrical circuit means for connecting said motor means to an electrical power supply, motor microswitch means, first and second double-lobe cam means fixed to the drive shaft of said motor means, said first cam means being adapted to operate said switch means and automatically put said motor means in circuit after said second cam means depresses and unlatches said sear means, second electrical circuit means for said motor means, a depth charge release switch for connecting said second electrical circuit means to said electrical power supply and causing said motor means to drive said second cam means into engagement with said sear means and releasing said ejector shaft means.

3. A practice depth charge dispensing apparatus comprising, a base plate having a rectangular bay opening formed therein, a chute mounted upon said base plate in such a manner that practice depth charges stacked in said chute may be guided through said rectangular opening, a pair of transverse vertically-arranged parallel plates fixed to said base plate, an ejector shaft journaled in said plates on one side of said chute, a pair of parallel ejector feet fixed to said ejector shaft and each having a toe portion adapted to extend into said chute for the purpose of having the lowermost practice depth charge therein resting upon said toe portions when said ejector shaft is in a cocked position, each of said ejector feet having a heel portion for intercepting and supporting the remaining practice depth charges when in a fired position, torsion spring means normally biasing said ejector shaft into the fired position, a sear pivotally connected to said base plate and having a latch portion adapted to latch onto and hold said ejector shaft in a cocked position, a spring-returned release rod operating said sear for releasing said ejector shaft and permitting said torsion spring means to bias said ejector shaft and said ejector feet from the cocked position to the fired position, a stop pivotally mounted on an adjacent one of said transverse plates, a resilient spring normally biasing said stop into a position for stopping the pivotal movement of said ejector shaft and said ejector feet at the fired position and causing the heel portions of said fired ejector feet to support the practice depth charges remaining in said chute, jettison means connected to said stop for completely disassociating said stop from said ejector shaft whereby said torsion spring means biases said ejector shaft and said ejector feet to a jettison position.

4. A practice depth charge dispensing apparatus as set forth in claim 3, further comprising, an electrical motor mounted on said base plate, a single-sector follower gear fixed to said ejector shaft, a driven double-sector gear fixed to the drive shaft of said motor and adapted to intermittently mesh with said single-sector follower gear, first electrical circuit means for connecting said motor to an electrical power supply, a motor microswitch, a first and a second double-lobe cam fixed to the drive shaft of said motor, said first cam being adapted to operate said switch and automatically put said motor in circuit, drive said motor and thereby cause said second cam to depress and unlatch said sear, second electrical circuit means for said motor, a depth charge release switch for connecting said second electrical circuit means to said electrical power supply and causing said motor to drive said second cam into engagement with said sear and thereby releasing said ejector shaft.

5. An apparatus of the character described comprising, a grounded electrical motor having a drive shaft and adapted to be energized from a D.C. electrical power supply, a first relay having a coil and first and second normally open contacts, a master switch, a charge release switch in series with said master switch, a selector switch in series with said master switch and in parallel with said charge release switch, a second relay having a grounded coil and a normally open contact, a cam fixed to said motor shaft, a motor microswitch having a two-position contact adapted to be operated by said cam for connecting said motor to the power supply when in a first position and said master switch and said selector switch are closed, resilient means biasing said motor microswitch to a second position when said motor has moved said cam out of contact therewith, said motor microswitch in said second position being connected to ground said first relay coil, said coils of said first and second relays being series connected when said charge release switch is closed and the contact of said first relay is closed, the closure of said first relay contact operating to conduct electricity to said motor via the second position of said motor microswitch contact, and said motor microswitch contact being moved back to said first position after said motor shaft has made a half turn and caused said cam to again engage said motor microswitch contact.

6. A practice depth charge dispensing apparatus as set forth in claim 1 wherein said chute means comprises an inboard and an outboard chute mounted side-by-side, two of said ejector shaft means being journaled in two respective pairs of said transverse vertically arranged parallel plates on opposite sides of said chutes and said bay opening, two sear means each pivotally connected to said base plate and each having a latch portion adapted to latch onto and hold an adjacent one of said ejector shaft means in a cocked position, spring-returned inboard and outboard release rod means for separately and selectively operating one of said two sear means, each of said release rod means having a flange fixed thereto supporting the ends of said yoke in such a manner that the operation of said jettisoning release rod means simultaneously causes the depression of said inboard and outboard release rod means and said respective sear means for causing the release of a practice depth charge from each of said chutes, said pulley means comprising a pair of pulleys, a separate pulley cable connected to each one of said jettison stop means at a first extremity of said cables and disposed intermediate the ends of said cables over a respective one of said pulleys and connected to said jettisoning pin at a second extremity of said cables, said jettisoning pin having a portion adapted to be engaged by said yoke and biased downwardly for simultaneously biasing both of said jettison stops to a position permitting said torsion springs to bias both said ejector shaft means and said ejector feet to a jettisoning position whereby said heel and toe portion of said ejector feet are moved out of said inboard and outboard chutes and all of said practice depth charges are jettisoned.

7. A practice depth charge dispensing apparatus as set forth in claim 6, further comprising, inboard and outboard electrical motor means mounted on said base plate, single-sector follower gear means fixed to each of said ejector shaft means, driven double-sector gear means fixed to the drive shafts of each of said motor means and adapted to intermittently mesh with said single-sector follower gear means, first electrical circuit means for connecting each of said motor means to an electrical power supply, motor microswitch means, first and second double-lobe cam means fixed to the drive shaft of each of said motor means, said first cam means being adapted to operate said switch means and automatically put said motor means in circuit after said second cam means depress and unlatch said sear means, second electrical circuit means for said motor means, a depth charge release switch for connecting said second electrical circuit means to said electrical power supply and causing said motor means to drive said second cam means into engagement with said sear means and releasing said ejector shaft means.

8. In an article dispensing apparatus, a chute adapted to have dispensable articles stacked therein, an opening formed in the bottom of the apparatus for permitting the dispensing of the articles therethrough from said chute, pivotal means having ejector foot means fixed thereto extending into said opening and preventing the dispensing and passage of the articles, resilient means normally biasing said ejector means for dispensing at least one of the articles, sear means latching said pivotal means in a cocked position, release means for unlatching said sear means and permitting said resilient means to bias said ejector foot means to a fired position, said ejector foot means having heel means for blocking the dispensing of more than one article after said ejector foot means has been biased from a cocked position to a fired position upon the unlatching of said sear means, jettison stop means for halting the pivotal movement of said ejector foot means for fixing the angular position of said heel means in said chute when in a fired position, jettison means moving said jettison stop means to a position which permits said resilient means to bias said ejector foot means to a jettison position whereby all of the articles remaining in said chute will be dispensed.

References Cited in the file of this patent

UNITED STATES PATENTS

| | | |
|---|---|---|
| 493,087 | Hayden | Mar. 7, 1893 |
| 2,279,093 | Peters | Apr. 7, 1942 |
| 2,594,199 | Motley | Apr. 22, 1952 |

FOREIGN PATENTS

| | | |
|---|---|---|
| 573,658 | Great Britain | Nov. 30, 1945 |